US008402857B2

(12) United States Patent
Wan

(10) Patent No.: US 8,402,857 B2
(45) Date of Patent: Mar. 26, 2013

(54) FAST CLUTCH MECHANISM FOR INDUSTRIAL DOOR

(75) Inventor: Wei Wan, Nanchang (CN)

(73) Assignee: Jiangxi Baisheng Gate & Door Automation Co., Ltd., Minying Science & Technology Park Nanchang, Jiangxi (CN)

( * ) Notice: Subject to any disclaimer, the term of this patent is extended or adjusted under 35 U.S.C. 154(b) by 593 days.

(21) Appl. No.: 12/540,374

(22) Filed: Aug. 13, 2009

(65) Prior Publication Data

US 2010/0294062 A1 Nov. 25, 2010

(30) Foreign Application Priority Data

May 19, 2009 (CN) ...................... 2009 2 0056850 U

(51) Int. Cl.

| | |
|---|---|
| ***F16H 1/16*** | (2006.01) |
| ***F16H 1/20*** | (2006.01) |
| ***E05F 15/00*** | (2006.01) |
| ***F16D 13/00*** | (2006.01) |
| ***F16D 19/00*** | (2006.01) |
| ***F16D 21/00*** | (2006.01) |
| ***F16D 23/00*** | (2006.01) |

(52) U.S. Cl. .......................... 74/425; 49/139; 192/89.21

(58) Field of Classification Search .................... 74/416, 74/417, 425, 625; 192/89.21; 49/139, 140
See application file for complete search history.

(56) References Cited

U.S. PATENT DOCUMENTS 3,515,250 A * 6/1970 Cantalupo .................. 192/48.91
3,603,175 A * 9/1971 Horton ............................ 74/625
4,034,624 A * 7/1977 Bianchini ....................... 74/625
4,285,496 A * 8/1981 Coles ....................... 251/129.03
2003/0233899 A1* 12/2003 Ishiyama ........................ 74/425

* cited by examiner

*Primary Examiner* — Justin Krause

(57) ABSTRACT

A fast clutch mechanism for an industrial door is provided. A worm is connected to a motor shaft of the industrial door and meshes with a worm wheel which is rotatably mounted on an output shaft of a transmission box. The fast clutch mechanism includes: a clutch sleeve surrounding the output shaft and restricted to be slid axially on the shaft, one end of the sleeve being capable of engaging a corresponding surface of the worm wheel, while the other end having a ring portion extended outwardly; a rotation device including a rotation shaft and a rotation actuating device coupled with one end of the rotation shaft; bevel gear driving device which includes a primary bevel gear mounted on the rotation shaft and a secondary bevel gear engaging with the primary bevel gear; a differential device including a drive gear rotatable with the secondary bevel gear, two follower gears engaging with the drive gear, and two cam shift levers connecting respectively the two follower gears in an axial direction, the two cam shift levers resisting against the ring portion of the clutch sleeve so as to make the clutch sleeve slide between an engagement position and an disengagement position with the clutch assembly. The present invention has the advantage of realizing ease clutch operation on the ground, thus reducing potential dangers.

10 Claims, 3 Drawing Sheets

FAST CLUTCH MECHANISM FOR INDUSTRIAL DOOR

BACKGROUND

1. Field of the Invention

The present invention relates to fast clutch mechanisms for industrial doors, and more particularly to a fast clutch mechanism for a door machine mounted at a height.

2. Background

A clutch mechanism for an industrial door is mainly used to enable a drive mechanism of a door machine to depart from the door machine when the door is subject to installation, maintenance or other urgent situations, thereby making it possible for the door to be pushed manually.

Referring to FIG. 3, in a typical industrial door, one end of a motor shaft (not shown) is connected to a worm 23. An output shaft 1 of a transmission box 14 has a worm wheel 3 engaged with the worm 23. The worm wheel 3 is restrained in an axial direction of the output shaft 1, but is rotatable with respect to the shaft in circumferential direction. In other words, the worm wheel 3 is capable of rotate relative to the output shaft 1. Idle rotation of the worm wheel 3 can result in change of the output shaft 1 between rotation status and stop status by means of a clutch sleeve 7, which is the basic principle of the clutch mechanism.

At present, there are mainly two types of clutch mechanisms for industrial doors according to the above basic principle: one employing shift fork and the other one using a spanner to uninstall the clutch mechanism. The shift fork is used to disconnect the clutch mechanism via operating one end of the shift fork; this however easily causes some failures and reduces the service life of the shift fork if the shift fork is used frequently. With respect to the other type of clutch mechanism, user needs to climb at a height to uninstall the clutch mechanism with a spanner, which takes a lot of time and energy, and is unsafe. In addition, when the door is laden, the clutch mechanism is not useful, which is inconvenient for user.

There are many sorts of clutch mechanisms applied in industry, for example, the clutch mechanism of vehicle. A clutch mechanism must be designed according to the structure of the special device which needs a clutch mechanism. Therefore, other clutch mechanisms may be unsuitable for industrial doors.

SUMMARY OF THE INVENTION

For overcoming the above shortcomings of the clutch mechanism, there is provided a fast clutch mechanism which is operative with ease, and has the ability to bring quick disengagement even under urgent situation or highly loaded situation.

To achieve this end, the present invention takes the following technical solutions:

A fast clutch mechanism for an industrial door in which a worm is connected to a motor shaft of the industrial door, and the worm meshes a worm wheel rotatably mounted on an output shaft of a transmission box. The fast clutch mechanism includes:

a clutch sleeve surrounding the output shaft, a rotation-limiting device being disposed between an inner wall of the sleeve and an external wall of the output shaft, a clutch assembly being located between one end of the sleeve and the worm wheel, and a ring portion being extended outwardly from the other end of the sleeve;

a rotation device comprising a rotation shaft and a rotation actuating device coupled with one end of the rotation shaft;

a bevel gear driving device comprising a primary bevel gear mounted on the rotation shaft and a secondary bevel gear engaging with the primary bevel gear; and a differential device comprising a drive gear rotatable with the secondary bevel gear, two follower gears engaging with the drive gear, and two cam shift levers connecting respectively the two follower gears in an axial direction, the two cam shift levers resisting against the ring portion of the clutch sleeve so as to make the clutch sleeve slide between an engagement position and an disengagement position with the clutch assembly.

According to an embodiment of the invention, the rotation actuating device is a mechanism having a chain wheel and a chain, the chain wheel is secured on the rotation shaft concentrically, and the chain is received in a groove of the chain wheel such that the user can manipulate both ends of the rotation shaft to cause rotation of the shaft clockwise or counterclockwise. According to another preferred embodiment of the invention, the rotation actuating device comprises an operating shank which is perpendicular to the rotation shaft and one end of which is secured on the rotation shaft so as to transfer directly rotation movement of the operating shank clockwise and counterclockwise to the rotation shaft. A free end of the operating shank defines a through hole therein for a rope passing therethrough, this enabling pull of the operating shank by a user standing on the ground via a rope.

For achieving automatic position return after the user pulling the rotation shaft and performing clutch process, the rotation shaft is sleeved with a torsion spring so as to provide a restoring force in a direction opposite to the rotation direction of the rotation shaft when the rotation shaft rotates. As such, the user can manipulate the chain of the chain wheel or rope of the operating shank only at one direction.

According to one embodiment of the invention, the secondary bevel gear of the bevel gear driving device is formed integrally with the driver gear of the differential device. It is preferred that the secondary bevel gear of the bevel gear driving device is connected to the drive gear of the differential device in a co-axial manner.

Specifically, the rotation limiting device comprises an axial rib and/or groove formed on an inner wall of the clutch sleeve and a corresponding axial groove and/or rib formed on an external wall of the output shaft. The clutch assembly comprises an axial hole and/or pin disposed on the clutch sleeve and a corresponding axial pin and/or hole disposed on the worm wheel. Each cam shift lever is elongated and has a cross-section of rectangular shape with different length and width, and this facilitates smooth movement of the clutch sleeve during rotation of the cam shift lever. The cross section of the cam shift lever has rounded corners.

Compared to prior art, the present invention has the following advantages:

Firstly, pulling of the operating shank by a rope (alternatively, rotation of the chain wheel by pulling a chain) drives the rotation shaft to rotate. The operating shaft takes one end of the rotation shaft as its support point, and thus it works like a lever mechanism (alternatively, a pulley device may be provided on the chain wheel). Consequently, it is possible for the user to perform a quick clutch operation with great convenience on the ground without any risk of climbing on high location necessary to perform clutch operation.

Secondly, the present invention has a good structure. The clutch sleeve has functions of engagement and disengagement due to transmission among the operating shank, the rotation shaft, the primary bevel gear, the drive gear, the follower gears, and the cam shift lever, especially the transmission between the primary bevel gear and the secondary bevel gear. It is convenient for arranging the structure of the clutch mechanism and installing or maintaining the clutch mechanism.

Finally, the present invention considers equal load conditions. At least two cam shift levers are used for balancing the load of the clutch sleeve, which makes user save labor, and also avoids the clutch sleeve from being broken, thereby Indirectly extending its service life.

Other advantages and novel features will be drawn from the following detailed description of embodiments with attached drawings, in which:

DETAILED DESCRIPTION

Figure 1:
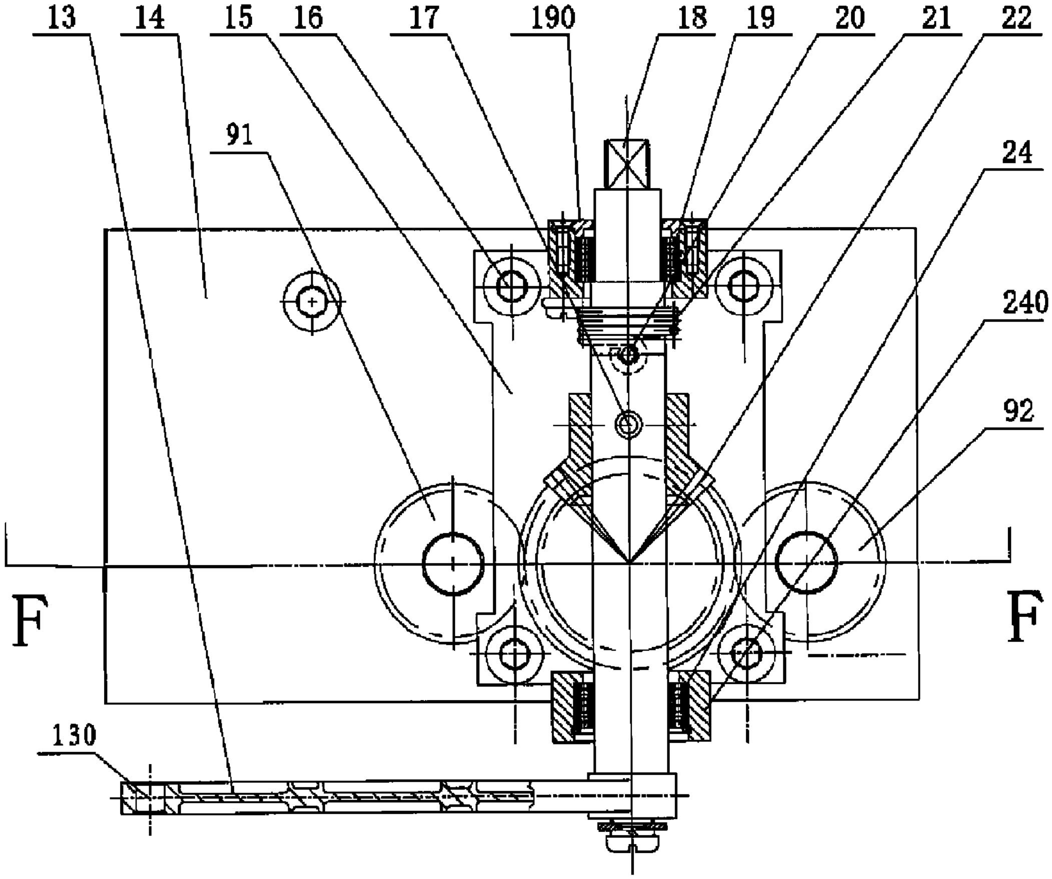
FIG. 1 is an internal schematic view of a fast clutch mechanism of a preferred embodiment of the present invention.

Referring to FIG. 1, in a fast clutch mechanism of a preferred embodiment of the present invention, a screw 16 is employed to secure a clutch bracket 15 onto an upper side of a transmission box 14. Bearing bases 190, 240 are installed on an upper end and a lower end of the clutch bracket 15 respectively. The bearing bases 190, 240 respectively include bearings 19, 24. A rotation shaft 18 is rotatably mounted between the bearings 19, 24. An end of the rotation shaft 18 is connected to an end of an operating shank 13. A free end of the operating shank 13 defines a through hole 130 therein. A rope (not shown) passes through the through hole 130 for pulling the operating shank 13. The operating shank 13 is used as a lever with the end of the operating shank 13 as a fulcrum, which makes it easy to pull the rope to enable the rotation shaft 18 to rotate. The operating shank 13 which works as a rotation actuating device and the rotation shaft 18 form a rotation device which provides power for other mechanical parts.

Figure 2:
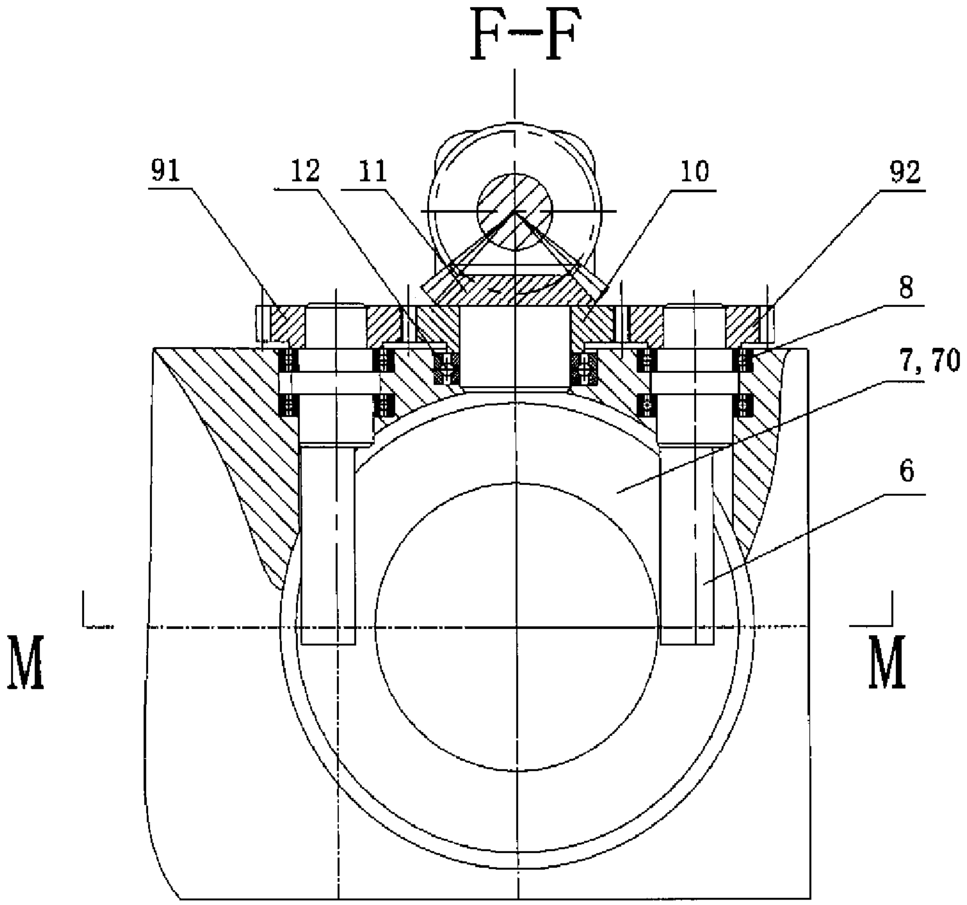
FIG. 2 is a sectional view of FIG. 1, taken along line F-F.

Referring to FIGS. 1 and 2, a bevel gear driving device includes a primary bevel gear 22 and a secondary bevel gear 11 engaged with the primary bevel gear 22. The primary bevel gear 22 and the secondary bevel gear 11 are umbrella-shaped gears and engaged each other in a perpendicular manner. The primary bevel gear 22 is secured on the rotation shaft 18 via a pin 17 which passes through the rotation shaft 18 along a direction perpendicular to an axial direction of the rotation shaft 18. Therefore, rotation of the shaft 18 causes subsequent rotation of the primary bevel gear 22 and as a result, the secondary bevel gear 11 meshed with the primary bevel gear 22 is also driven to rotate simultaneously. As shown in FIG. 2, the secondary bevel gear 11 is mounted in the transmission box 14 via a bearing 12 with part of the secondary bevel gear 11 extended out of the box 14 and engaged the primary bevel gear 22 shown in FIG. 1.

Figure 3:
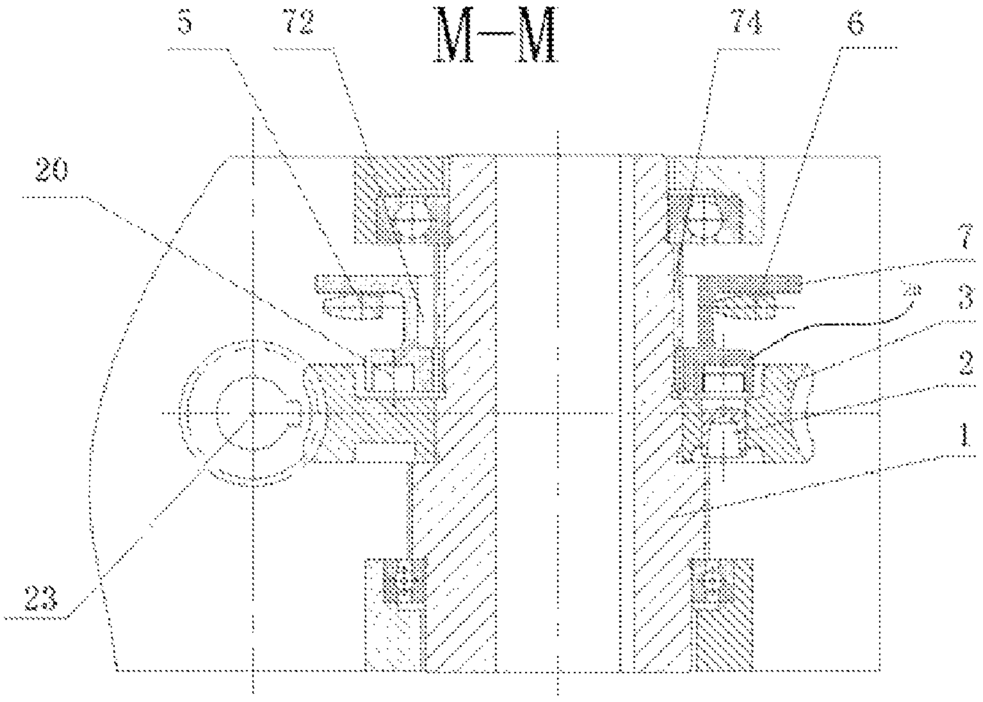
FIG. 3 is a sectional view of FIG. 2, taken along line M-M.

Referring to FIGS. 1 to 3, a differential device includes a drive gear 10, two follower gears 91, 92, and two cam shift levers 5, 6.

The drive gear 10 of the differential device is connected to the secondary bevel gear 11 of the bevel gear driving device in a coaxial manner so as to rotate together. For achieving rotating synchronously, the drive gear 10 can be configured so as to surround the secondary bevel gear 11. The drive gear 10 also can be constructed integrally with the bevel gear 11. Alternatively, they can be connected together by means of other mechanical construction. Referring to FIGS. 1 and 2, the two follower gears 91, 92 are symmetrically disposed at opposite sides of the secondary bevel gear 11. The secondary bevel gear 11 drives the drive gear 10 so as to drive the two follower gears 91, 92 to rotate.

Referring to FIGS. 2 and 3, the cam shift levers 5, 6 protrude respectively from bases of the two follower gear 91, 92 and then extend into the transmission box 14 for resisting against a ring portion 70 of a clutch sleeve 7. One end of each cam shift levers 5, 6 is secured to the follower gear 91, 92 respectively. Lengthwise directions of the cam shift levers 5, 6 and the axial directions of the follower gear 91, 92 are respectively consistent. The cross section of the cam shift lever 5 or 6 has a non-circular shape, as shown in FIG. 3. More specifically, the cam shift levers 5, 6 have a rectangular cross section with edges which have been filleted and share different length. Accordingly, it is possible for the clutch sleeve 7 to be raised or lowered smoothly owing to length difference in cross-section of the cam shift levers 5, 6, in case of the cam shift levers 5, 6 are actuated by two follower gears 91, 92 respectively.

The clutch sleeve 7 is slidably clutch sleeved on the output shaft 1 of the transmission box 14, and is disposed above the worm wheel 3, as shown in FIG. 3. One end of the clutch sleeve 7 is provided with a ring portion 70 extended radially outwardly therefrom. The cam shift levers 5, 6 shown in FIG. 2 are indicated in FIG. 3 as cross-section. A longitudinal surface of each lever is pressed against a bottom surface of the ring portion 70 shown in FIG. 3, thereby achieving engagement of the levers 5, 6 with the clutch sleeve 7. The other end of the clutch sleeve 7 is shown on bottom portion of FIG. 3 and defines a plurality of axial holes 20 located around the output shaft 1 in circumferential direction. A plurality of axial pins 2 protrudes from a corresponding surface of the worm wheel 3 in order to engage the corresponding axial holes 20. To make the clutch sleeve 7 slide axially, as shown in FIG. 3, the cross sections of the cam shift lever 5, 6 are disposed horizontally. The axial holes 20 of the clutch sleeve 7 respectively engage with the axial pins 2 of the worm wheel 3. The clutch sleeve 7 is driven to rotate synchronously if the worm wheel 3 rotates. When the cross sections of the cam shift lever 5, 6, are disposed vertically to after the cam shift lever 5, 6 is rotated 90 degrees, the clutch sleeve 7 will be separated from the worm wheel 3 due to lifting action during the rotation of the cam shift levers 5, 6. In this case, the axial pins 2 are disconnected from respective axial holes 20. As a result, rotation of the worm wheel 3 will have no effect on that of the clutch sleeve 7.

The axial holes 20 of the clutch sleeve 7 and the axial pins 2 of the worm wheel 3 form a clutch assembly with engageable features. When the axial holes 20 and corresponding axial pins 2 engage each other, it is maintained that the clutch sleeve 7 and the worm wheel 3 will rotate together. There exist many other implementations to obtain this simultaneous rotation. For example, the axial pins may also protrude from the clutch sleeve 7, whereas the axial holes may be defined in the worm wheel 3. Optionally, other similar engagement components may be provided between the interface therebetween.

All these engagement examples are of pin-hole type and well known to ordinary person of the art and therefore, these engagement configurations can be applied to the invention directly.

To make sure that the axial slide of the clutch sleeve 7 will not affect the rotation thereof, or in other words, to make sure that the rotation of the clutch sleeve 7 will result in synchronous rotation of the output shaft 1 of the transmission box 14 after engagement of the clutch sleeve 7 with the worm wheel 3, there must be a rotation limiting device with son-mother connection. Concretely speaking, the rotation limiting device includes an axial slot 72 (or an axial rib) defined in an inner surface of the clutch sleeve 7, and an axial rib 74 (or an axial slot) protruded from a portion of the output shaft 1 (the portion of the output shaft 1 where the clutch sleeve 7 slides due to the rotation of the cam shift levers 5, 6), thus forming a slidable connection therebetween. Therefore, it is realized that rotation of the clutch sleeve 7 with respect to the shaft 18 will not happen due to limitation of the rotation limiting device. Instead, the clutch sleeve 7 will rotate together with the shaft 18 when driven by the worm wheel 3. For the same reason, connection relationship between the axial slot 70 and the axial rib 74 is not limited by this embodiment. Other sorts of slidable connection known by ordinary person of the art can be directly applied in the present invention.

By cooperation of the rotation limiting device and the clutch assembly, the clutch sleeve 7 is ensured to slide between an engaging position and a disengaging position with the worm wheel 3, and is ensured to drive the output shaft 1 of the transmission box 14 to rotate synchronously. Accordingly, disengagement and engagement function is fully obtained.

As Shown in FIG. 1, in order for the rotation shaft 18 to be returned to its original position automatically after being operated by user, a torsion spring 21 is provided such that the rotation shaft 18 passes through the spring 21. One end of the torsion spring 21 is connected with the bearing base 190 of the rotation shaft 18 or a part of the bearing base 190, or the clutch bracket 15 as a spring pin of the torsion spring 21, while The other end of the torsion spring 21 is secured to the rotation shaft 18 by a screw 20. The torsion spring 21 can provide restoration force regardless of rotation direction. As such, the rotation shaft 18 will resume its original position under restoration force immediately after the user released the rope.

Referring to FIGS. 1 to 3, when the clutch mechanism of this embodiment is mounted on an industrial door at a high position, the cross sections of the two cam shift levers 5, 6 are disposed horizontally, as shown in FIG. 3. At this time, the clutch sleeve 7 tightly engages the worm wheel 3, hence forming an interconnected relationship. A motor shaft (not shown) of the industrial door drives the worm 23 connected thereto, which in turn drives the worm wheel 3 to rotate, thereby realizing opening or closing of the industrial door. When the industrial door needs to be opened or closed by manual operation, firstly the industrial door is needed to be disconnected with a its motor. For achieving this purpose, the user standing on the ground firstly pulls the rope hang from the free end of the operating shank 13, and then the operating shank transfer the force to the rotation shaft 18. Thereby, the rotation shaft 18 drives the primary bevel gear 22 to rotate. Therefore, the primary bevel gear 22 drives the secondary bevel gear 11 which in turn drives the drive gear 10 to rotate, thereby driving the two follower gears 91, 92 to rotate. Finally, the two cam shift levers 5, 6 are driven respectively to rotate by the follower gears 91, 92. When the cross sections of the cam shift levers 5, 6 become a vertical situation from a horizontal situation, the clutch sleeve 7 is disconnected from the worm wheel 3. Concretely speaking, the axial holes 20 of the clutch sleeve 7 disengage with the axial pins 2 of the worm wheel 3 respectively. Therefore, the motor drives the worm 23, thereby driving the worm wheel 3 to rotate, but can not drive the output shaft 1 to rotate. In this case, the user is able to open or close the industrial door manually. The rotation shaft 18 will rotate reversely due to the restoring force provided by the torque spring 21 after the user released the rope in his hand, thereby driving other parts engaged with the rotation shaft 18 to rotate reversely. Finally, the cam shift levers 5, 6 also rotates reversely to make the clutch sleeve 7 slide to engage with the worm wheel 3, thereby the industrial door become once again under the control of the motor.

The rotation actuating device of this embodiment can be replaced by a mechanism with a chain wheel and a chain other than the aforementioned operating shank 13. The chain wheel is secured to the rotation shaft 18 in a coaxial manner, and the chain of the mechanism engages with a groove of the chain wheel. Preferably, A guiding sheath can be used in the groove of the chain wheel for avoiding the chain from being locked. Therefore, the chain plays the same role as the rope in this embodiment.

Changes may be made in the structure of this embodiment. For example, the operating shank 13 can extend vertically downwardly to the ground to facilitate user operation. In this case, the rope and the torsion spring are not necessary any more in this embodiment, as user can operate directly the operating shank 13 according to requirement. For the same reason, if the mechanism with a chain wheel and a chain wheel is used as the rotation actuating device in this embodiment, the user can pull the chain of the mechanism, so the torsion spring is not necessary any more.

In a word, the clutch mechanism of the present invention has a good structure to fast operate the industrial door. Furthermore, the clutch mechanism of the present invention prolongs its service life due to the good structure.

What is claimed is:

1. A fast clutch mechanism for an industrial door in which a worm meshes a worm wheel rotatably mounted on an output shaft of a transmission box, wherein the fast clutch mechanism comprising:

a clutch sleeve surrounding the output shaft, a rotation-limiting device being disposed between an inner wall of the sleeve and an external wall of the output shaft, a clutch assembly being located between one end of the sleeve and the worm wheel, and a ring portion being extended outwardly from the other end of the sleeve;

a rotation device comprising a rotation shaft and a rotation actuating device coupled with one end of the rotation shaft;

a bevel gear driving device comprising a primary bevel gear mounted on the rotation shaft and a secondary bevel gear engaging with the primary bevel gear;

a differential device comprising a drive gear rotatable with the secondary bevel gear, two follower gears engaging with the drive gear, and two cam shift levers connecting respectively the two follower gears in an axial direction, the two cam shift levers resisting against the ring portion of the clutch sleeve so as to make the clutch sleeve slide between an engagement position and an disengagement position with the clutch assembly.

2. The fast clutch mechanism as described in claim 1, wherein the rotation actuating device comprises an operating shank which is perpendicular to the rotation shaft and one end of which is secured on the rotation shaft so as to transfer directly rotation movement of the operating shank clockwise and counterclockwise to the rotation shaft.

3. The fast clutch mechanism as described in claim 2, wherein a free end of the operating shank defines a through hole therein for a rope passing therethrough.

4. The fast clutch mechanism as described in claim 3, wherein the rotation shaft is sleeved with a torsion spring so as to provide a restoring force in a direction opposite to the rotation direction of the rotation shaft when the rotation shaft rotates.

5. The fast clutch mechanism as described in claim 4, wherein the secondary bevel gear of the bevel gear driving device is formed integrally with the driver gear of the differential device.

6. The fast clutch mechanism as described in claim 5 wherein the secondary bevel gear of the bevel gear driving device is connected to the drive gear of the differential device in a co-axial manner.

7. The fast clutch mechanism as described in claim 6, wherein the rotation limiting device comprises an axial rib and/or groove formed on an inner wall of the clutch sleeve and a corresponding axial groove and/or rib formed on an external wall of the output shaft.

8. The fast clutch mechanism as described in claim 7, wherein the clutch assembly comprises an axial hole or pin disposed on the clutch sleeve and a corresponding axial pin or hole disposed on the worm wheel.

9. The fast clutch mechanism as described in claim 8, wherein each cam shift lever is elongated and has a cross-section of rectangular shape with different length and width.

10. The fast clutch mechanism as described in claim 9, wherein the cross section of the cam shift lever has rounded corners.

* * * * *